(12) United States Patent
Takeuchi

(10) Patent No.: US 7,880,319 B2
(45) Date of Patent: Feb. 1, 2011

(54) POWER GENERATING DEVICE UTILIZING HYDRODYNAMIC FORCE

(75) Inventor: Kesatoshi Takeuchi, Shioziri (JP)

(73) Assignee: Seiko Epson Corporation (JP)

( * ) Notice: Subject to any disclaimer, the term of this patent is extended or adjusted under 35 U.S.C. 154(b) by 428 days.

(21) Appl. No.: 12/069,421

(22) Filed: Feb. 8, 2008

(65) Prior Publication Data

US 2008/0191483 A1 Aug. 14, 2008

(30) Foreign Application Priority Data

Feb. 13, 2007 (JP) ............................. 2007-032146

(51) Int. Cl.
*H02P 9/00* (2006.01)
*F03D 7/00* (2006.01)
(52) U.S. Cl. .......................... 290/44; 290/55
(58) Field of Classification Search ................. 290/44, 290/55
See application file for complete search history.

(56) References Cited

U.S. PATENT DOCUMENTS

| 4,350,899 A * | 9/1982 | Benoit ........................ 290/55 |
| 4,449,053 A * | 5/1984 | Kutcher ....................... 290/44 |
| 4,464,579 A * | 8/1984 | Schwarz ....................... 290/44 |
| 4,565,929 A * | 1/1986 | Baskin et al. .................. 290/44 |
| 4,613,763 A * | 9/1986 | Swansen ....................... 290/44 |
| 6,737,757 B1* | 5/2004 | Stiesdal ........................ 290/44 |
| 7,518,258 B1* | 4/2009 | Marvin ......................... 290/44 |
| 2003/0168864 A1* | 9/2003 | Heronemus et al. ........... 290/55 |
| 2005/0212300 A1* | 9/2005 | Kimura et al. ................ 290/55 |

FOREIGN PATENT DOCUMENTS

| JP | 08-322298 | 12/1996 |
| JP | 2001-298982 | 10/2001 |

* cited by examiner

*Primary Examiner*—Joseph Waks
(74) *Attorney, Agent, or Firm*—Harness, Dickey & Pierce, P.L.C.

(57) ABSTRACT

The power generating device (1000) has a vane (1200) rotated by hydrodynamic force from a fluid; a generator motor (100); a flow velocity measuring unit (1130); a rotation speed measuring unit; and a control unit (200). In the event that at least one of the flow velocity and the rotation speed lies within a prescribed low range at startup of the generator motor, the control unit (200) operates the generator motor as a motor to increase the rotation speed of the vane, and then operates the generator motor as a generator.

2 Claims, 15 Drawing Sheets

Phase = 0 or 2π

Phase = π/2

Phase = π

Phase = 3π/2

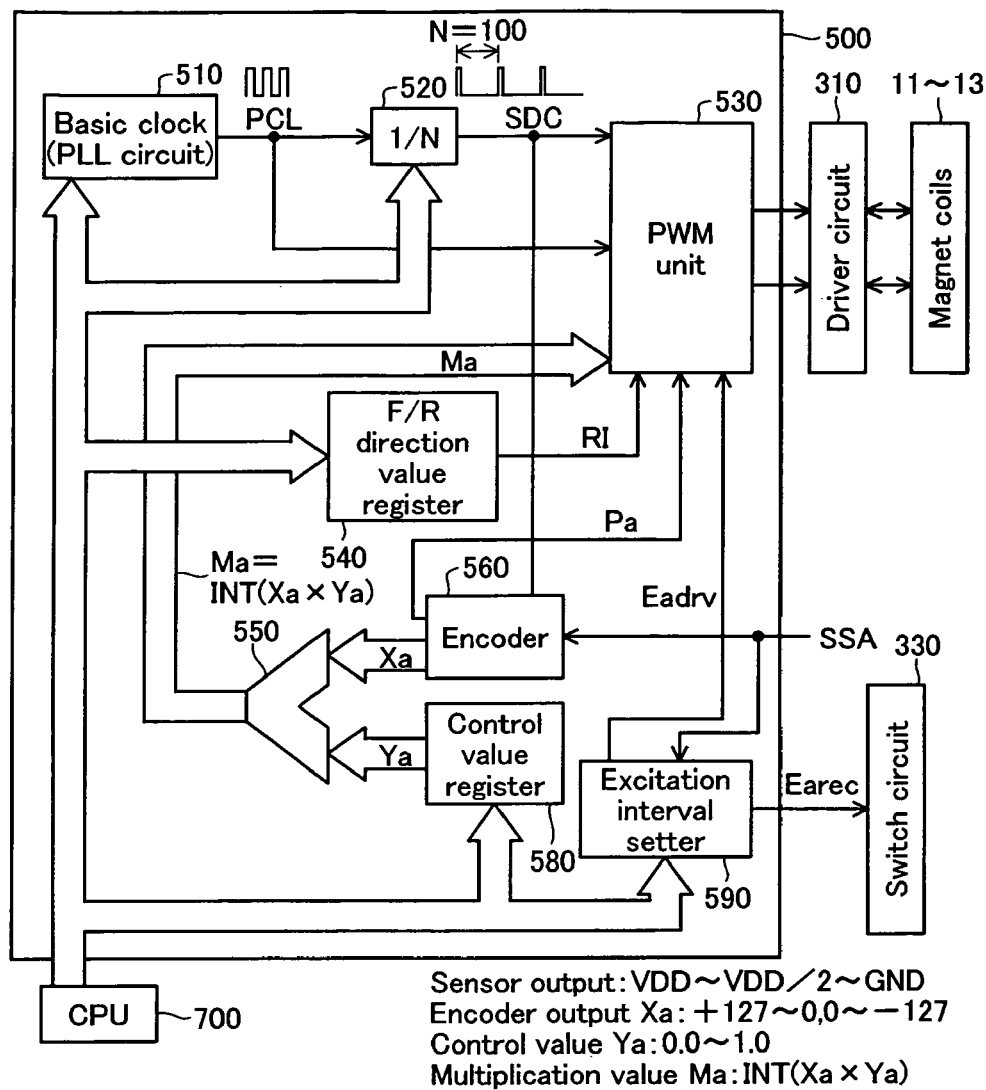

Fig.8A
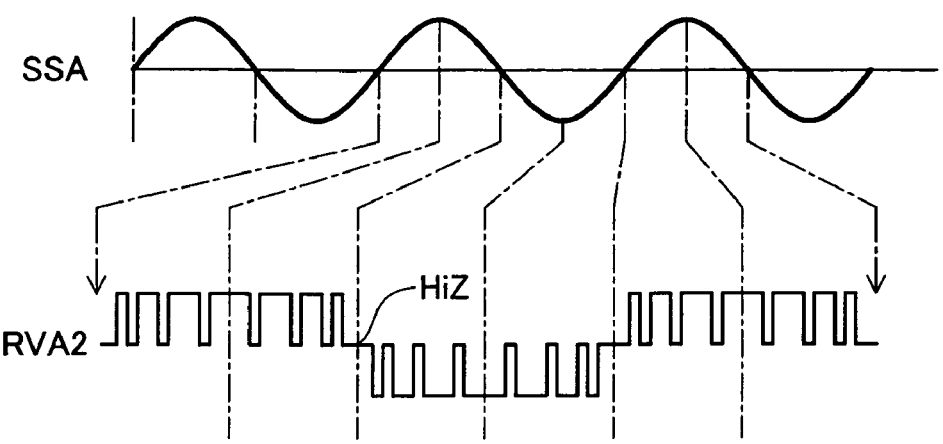
Fig.8B
Fig.8C
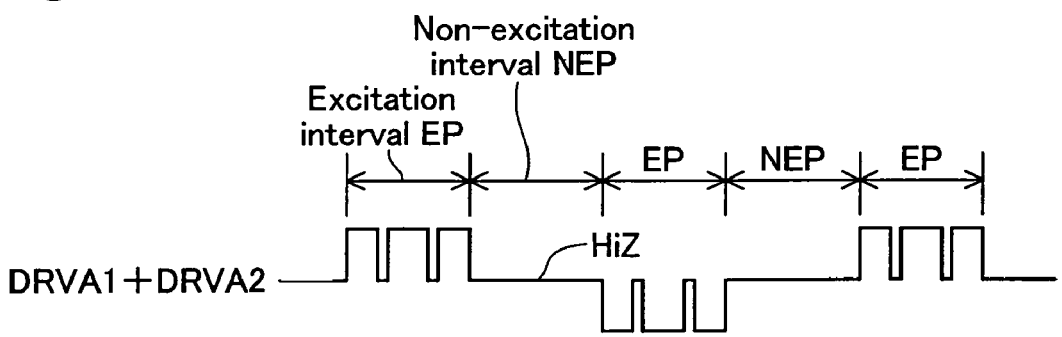

During forward rotation(RI="L")

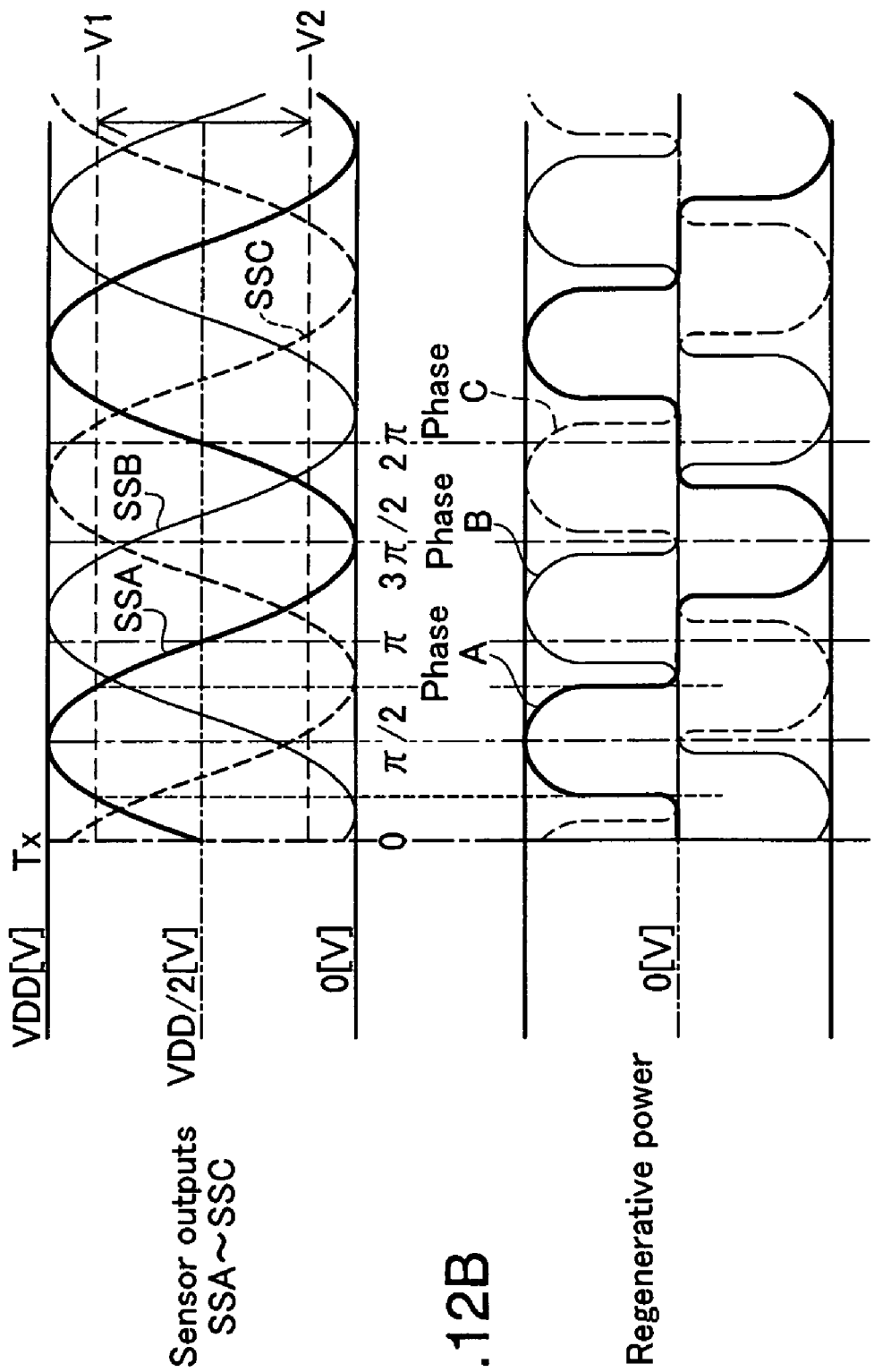

US 7,880,319 B2

POWER GENERATING DEVICE UTILIZING HYDRODYNAMIC FORCE

CROSS-REFERENCE TO RELATED APPLICATIONS

The present application claims the priority based on Japanese Patent Application No. 2007-32146 filed on Feb. 13, 2007, the disclosure of which is hereby incorporated by reference in its entirety.

BACKGROUND OF THE INVENTION

1. Field of the Invention

The present invention relates to a power generating device that utilizes hydrodynamic force.

2. Description of the Related Art

A power generator that utilizes hydrodynamic force can be realized through the use of a brushless motor structure, for example. Brushless motors known in the art are disclosed, for example, in JP2001-298982A.

Wind power generators are one example of power generating devices that utilize hydrodynamic force. In a wind power generator, a generator is turned through the rotation of a vane, generating power according to this rotation. However, the mechanical linkage between the vane and the generator experiences appreciable mechanical loss. The generator also suffers appreciable excitation loss. One problem resulting from such losses is that, under low-wind conditions, the generator will not be able to start turning, and cannot generate power.

This problem is not limited to wind power generators, and is a problem common generally to power generating devices that utilize hydrodynamic force.

SUMMARY OF THE INVENTION

An object of the present invention is to provide technology whereby power generation can be initiated even under conditions of low hydrodynamic force.

According to an aspect of the present invention, there is provided a power generating device utilizing hydrodynamic force. The power generating device comprises: a vane rotated by hydrodynamic force from a fluid; a generator motor mechanically linked to the vane and operative as a generator and a motor. The power generating device also comprises at least one of a flow velocity measuring unit configured to measure flow velocity of the fluid, and a rotation speed measuring unit configured to measure the rotation speed of the generating device. The power generating device further comprises a control unit configured to control the generator motor based on at least one of flow velocity measured by the flow velocity measuring unit and rotation speed measured by the rotation speed measuring unit. If at least one of the flow velocity and the rotation speed lies within a prescribed low range at startup of the generator motor, the control unit operates the generator motor as a motor to increase the rotation speed of the vane, and then operates the generator motor as a generator According to this power generating device, in the event that at least one of the flow velocity and the rotation speed lies within a prescribed low range, the generator motor will operate as a generator after first operating as a motor in order to increase the rotation speed of the vane, thereby making it possible to initiate power generation even in conditions where power generation cannot be initiated unassisted due to low hydrodynamic force.

It is possible for the invention to be embodied in various ways, for example, a power generating device and method of controlling the same, and so on.

BRIEF DESCRIPTION OF THE DRAWINGS

FIGS. 7A-7E illustrate internal configuration and operation of a control signal generator;

FIGS. 8A-8C illustrate correspondence relationships between sensor output waveforms and drive signal waveforms;

FIGS. 12A and 12B illustrate an example of sensor outputs and regenerative power during regeneration;

DESCRIPTION OF THE PREFERRED EMBODIMENT

The present invention will be described herein through certain preferred embodiments, in the following order.

A. Device configuration and Operation of Power Generating Device:

B. Control Method Embodiments:

C. Modified Embodiments:

A. Device Configuration and Operation of Power Generating Device

Figure 1:
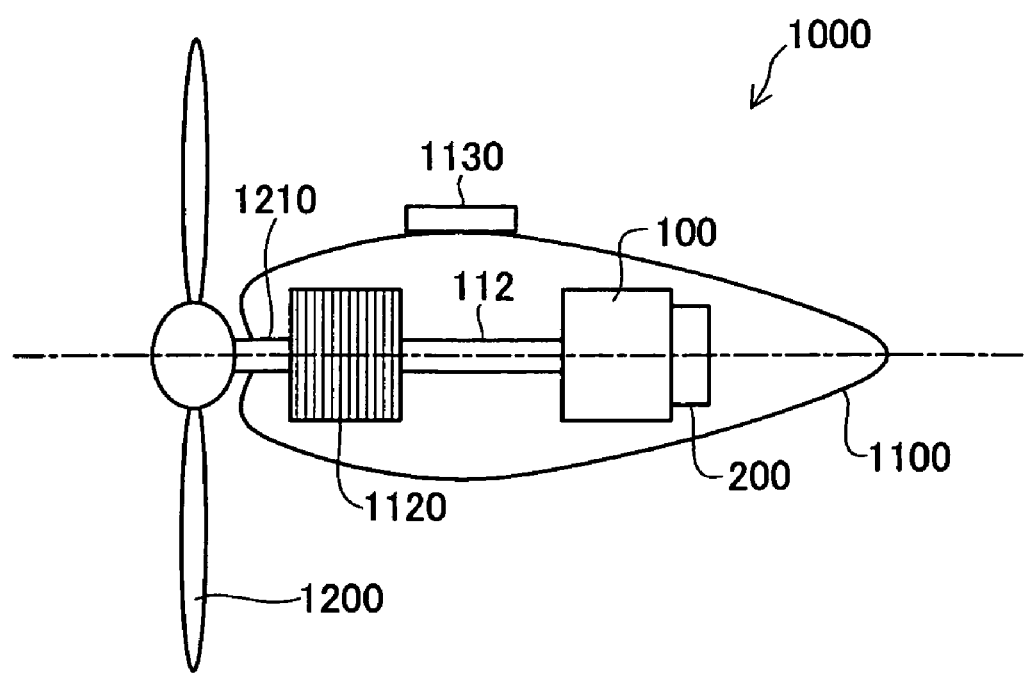
FIG. 1 illustrates the general configuration of a wind power generator pertaining to an embodiment of the present invention.

FIG. 1 shows the general configuration of a wind power generator pertaining to an embodiment of the present invention. The wind power generator 1000 has a vane 1200 and a main housing 1100. The main housing 1100 has a motor unit 100, and a control circuit 200 for controlling the motor unit 100. The shaft 112 of the motor unit 100 is mechanically linked to the shaft 1210 of the vane 1200 via a transmission 1120. This transmission 1120 is a mechanism for increasing the rotation speed of the motor unit 100 to a level higher than the rotation speed of the vane 1200. The main housing 1100 also has a wind gauge 1130 for measuring wind speed.

Figure 2A:
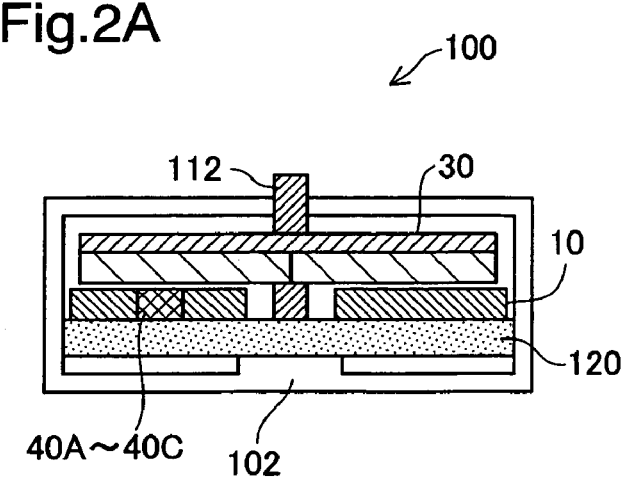
FIGS. 2A-2C are sectional views depicting the configuration of a motor unit.
Figure 2B:
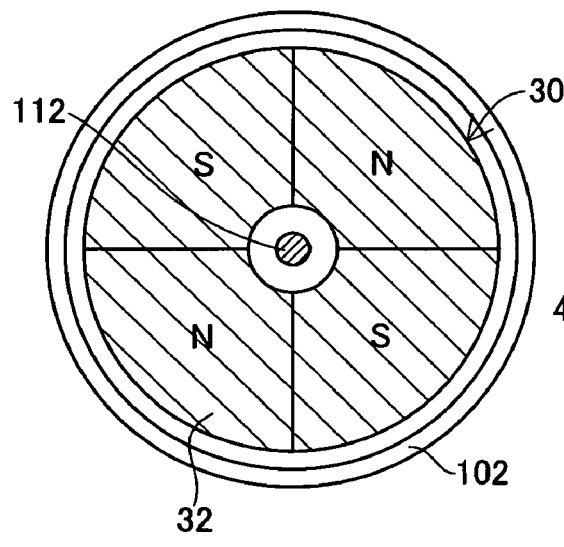
Figure 2C:
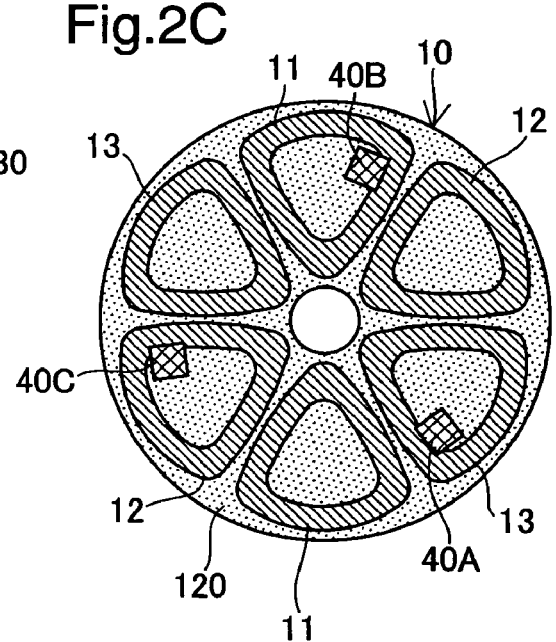

FIGS. 2A through 2C depict the configuration of the motor unit 100 in cross section. This motor unit 100 is configured as a brushless motor, and constitutes a generator motor having the functions of both a motor and a generator. In preferred practice, the generator motor will be an electric brushless motor that excels in terms of both driving and generating efficiency; and preferably the structure thereof will be substantially free of excitation loss (cogging, eddy current).

This motor unit 100 has a stator unit 10 and a rotor unit 30, each of which has generally disk shaped contours. The stator unit 10 (FIG. 2C) is furnished on a circuit board 120 with three sets of magnet coils 11 through 13 constituting three phases, and three magnetic sensors 40A through 40C for the respective phases. Hereinafter, the three sets of magnet coils 11 through 13 will be referred to as the "Phase A coils 11," the "Phase B coils 12," and the "Phase C coils 13." The magnetic sensors 40A through 40C will be referred to as the "Phase A magnetic sensor 40A," the "Phase B magnetic sensor 40B," and the "Phase C magnetic sensor 40C."

The rotor unit 30 (FIG. 2B) is furnished with four magnets 32, and the center axis of the rotor unit 30 constitutes a rotary shaft 112. The direction of magnetization of these magnets 32 is perpendicular to the plane of the drawing paper in FIG. 2B; this corresponds to the vertical direction in FIG. 2A.

Figure 3A:
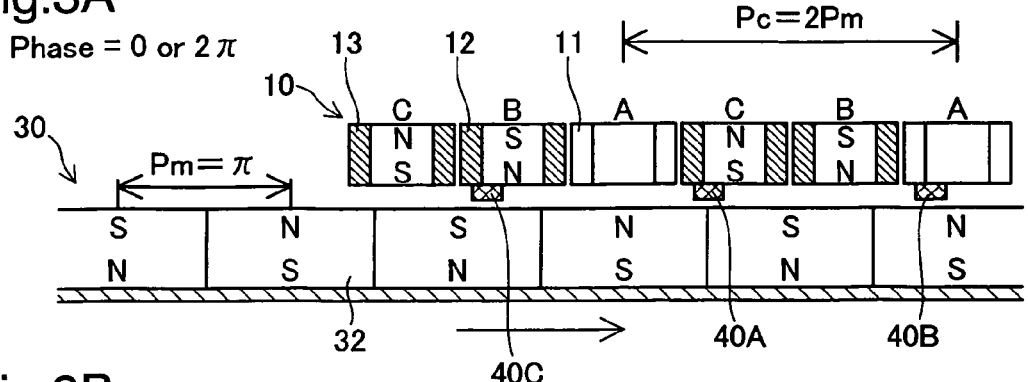
FIGS. 3A-3D illustrate positional relationships among the magnet array and coil arrays during operation of the motor.

FIGS. 3A through 3D illustrate positional relationships among the magnet array and coil arrays during operation of the motor. As shown in FIG. 3A, the magnets 32 are positioned at a constant magnetic pole pitch Pm, with neighboring magnets having opposite directions of magnetization. The two coils making up the coil group of a single phase are positioned at constant pitch Pc, and are always excited in the same direction. Coils of adjacent phases are spaced apart by the equivalent of one-third the pitch Pc between coils of the same phase. The pitch Pc between coils of the same phase is equal to twice the magnetic pole pitch Pm. Expressed as the electrical angle, the magnetic pole pitch Pm corresponds to $\pi$. An electrical angle of $2\pi$ is associated with the mechanical angle or distance of displacement occurring when the phase of the drive signal changes by the equivalent of $2\pi$. In the present embodiment, when the drive signal phase changes by $2\pi$, the rotor unit 30 will undergo displacement by the equivalent of twice the magnetic pole pitch Pm.

Figure 3B:
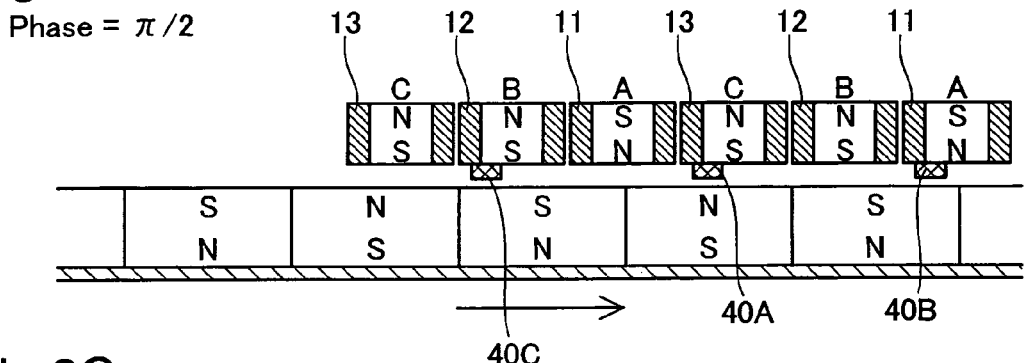
Figure 3C:
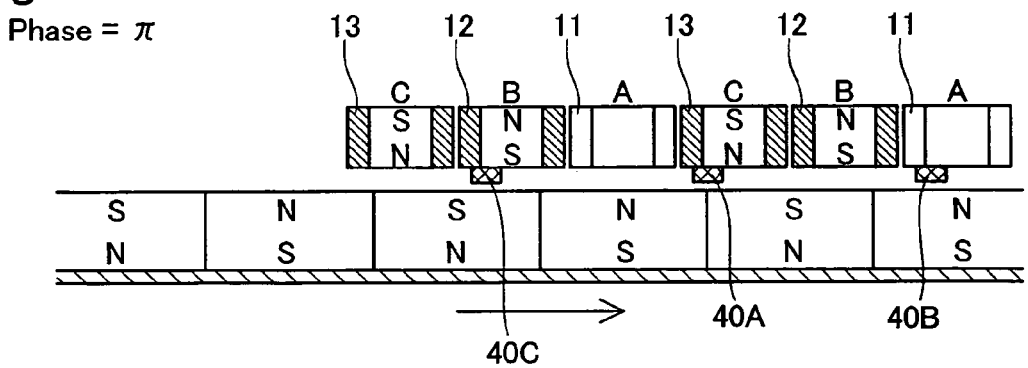
Figure 3D:
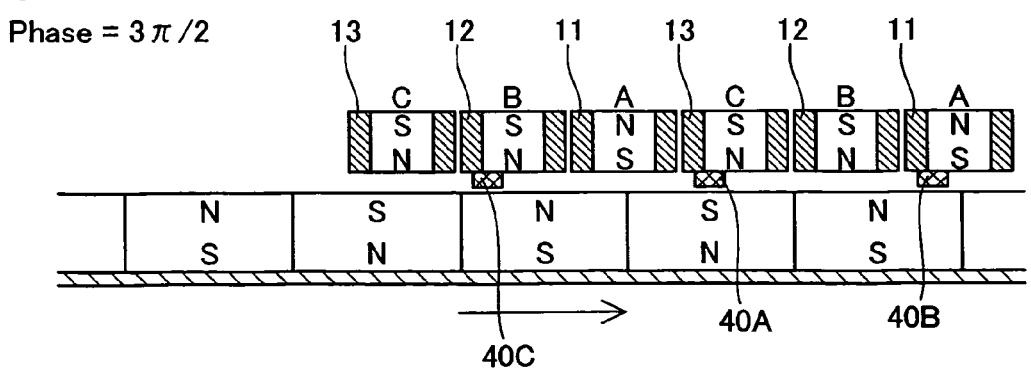

FIG. 3A depicts a state in which the phase is 0 or $2\pi$. FIGS. 3B through 3D depict states at points in time when the phase is $\pi/2$, $\pi$, and $3\pi/2$ respectively. In FIGS. 3A and 3C, the Phase A coils 11 are shown without hatching; this is because the polarity of the drive signal of the Phase A coils 11 reverses (i.e. the excitation direction reverses) at this timing.

Figure 4A:
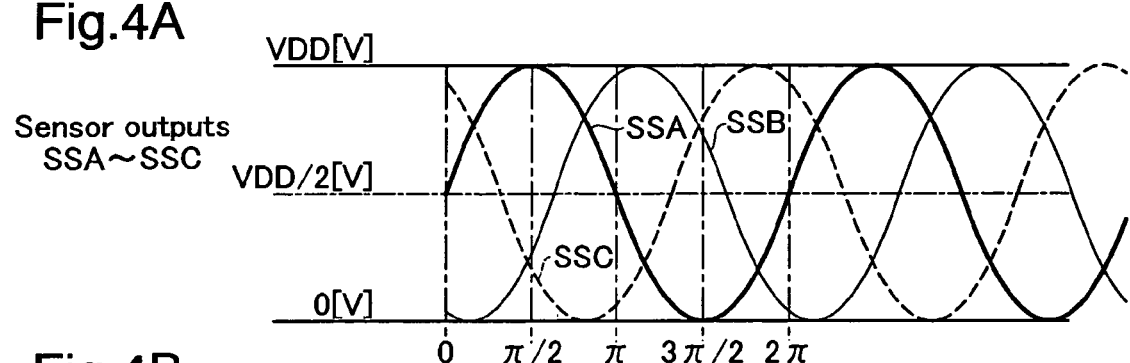
FIGS. 4A and 4B illustrate exemplary sensor outputs and drive signals during forward rotation of the motor.
Figure 4B:
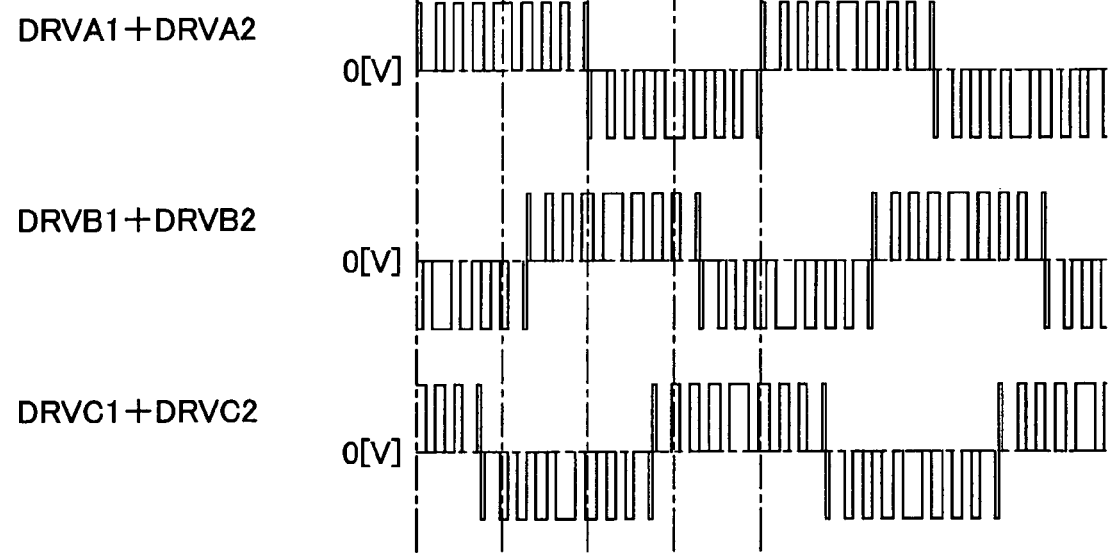

FIGS. 4A and 4B illustrate exemplary sensor outputs and drive signals during forward rotation of the motor. FIG. 4A depicts the sensor outputs SSA through SSC of each phase. Hall IC sensors having analog output may be employed as the sensors 40A through 40C. The three sensor outputs SSA, SSB, SSC constitute a clean 3-phase signal whose phases are successively shifted in $2\pi/3$ increments.

FIG. 4B illustrates exemplary three phase drive signals, respectively generated through PWM control using the three phase magnetic sensor outputs SSA through SSC. The Phase A drive signals DRVA1, DRVA2 have effective voltage of similar shape to the Phase A sensor output SSA. The Phase A first drive signal DRVA1 is a signal that pulses only when the sensor output SSA is positive, and the second drive signal DRVA2 is a signal that pulses only when the sensor output SSA is positive; these are portrayed together in FIG. 4B. For convenience in illustration, the second drive signal DRVA2 is depicted as negative pulses. This convention is employed for the other phases as well.

Figure 5:
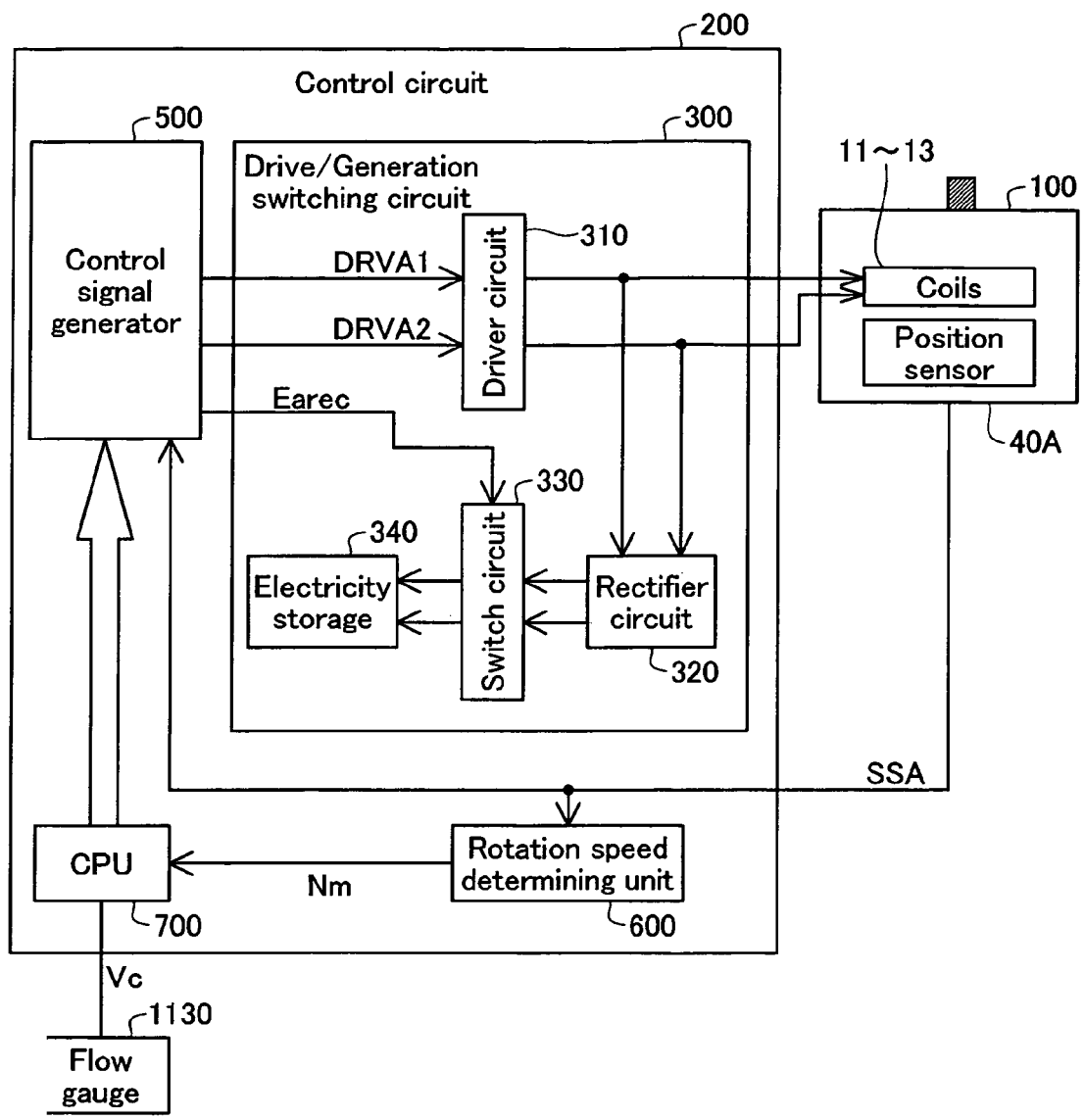
FIG. 5 is a block diagram showing the configuration of a control circuit.

FIG. 5 is a block diagram showing the configuration of the control circuit 200. The control circuit 200 is furnished with a drive/generation switching circuit 300, a control signal generator 500, a rotation speed determining unit 600, and a CPU 700. The drive/generation switching circuit 300 has a driver circuit 310, a rectifier circuit 320, a switch circuit 330, and an electricity storage unit 340. The driver circuit 310 is an H-bridge circuit for driving the coils 11-13 of the motor unit 100. In preferred practice, a level shifter circuit will be disposed before the control terminal of the transistor on the High side (side closer to the power supply) of the driver circuit; however, this has been omitted in the drawing. The rectifier circuit 320 is a circuit for rectifying the regenerative current supplied from the motor unit 100 when the motor unit 100 functions as a generator. The switch circuit 330 switches between delivering or not delivering the electric current rectified by the rectifier circuit 320 to the electricity storage 340, i.e. whether or not to carry out the regeneration and charging operation. The control signal generator 500 generates drive signals DRVA1, DRVA2 for driving the motor unit 100, and a changeover signal Earec presented to the switching circuit 330. In FIG. 5, for convenience, only the Phase A signals are shown; signals for the other phases are generated analogously.

The rotation speed determining unit 600 determines the rotation speed Nm of the motor unit 100, on the basis of the output SSA of the position sensor 40A of the motor unit 100. It is also possible to determine the rotation speed on the basis of the signal from another sensor (e.g. a rotary encoder). The CPU 700 switches between driving mode and generating mode by issuing commands to the control signal generator 500 on the basis of the rotation speed Nm and flow velocity Vc provided by the flow gauge 1130. The switching method will be discussed in detail later. The CPU 700 also has the functions of setting various register values in the control circuit 200, and of providing contol values to other circuit elements within the control circuit 200.

Figure 6:
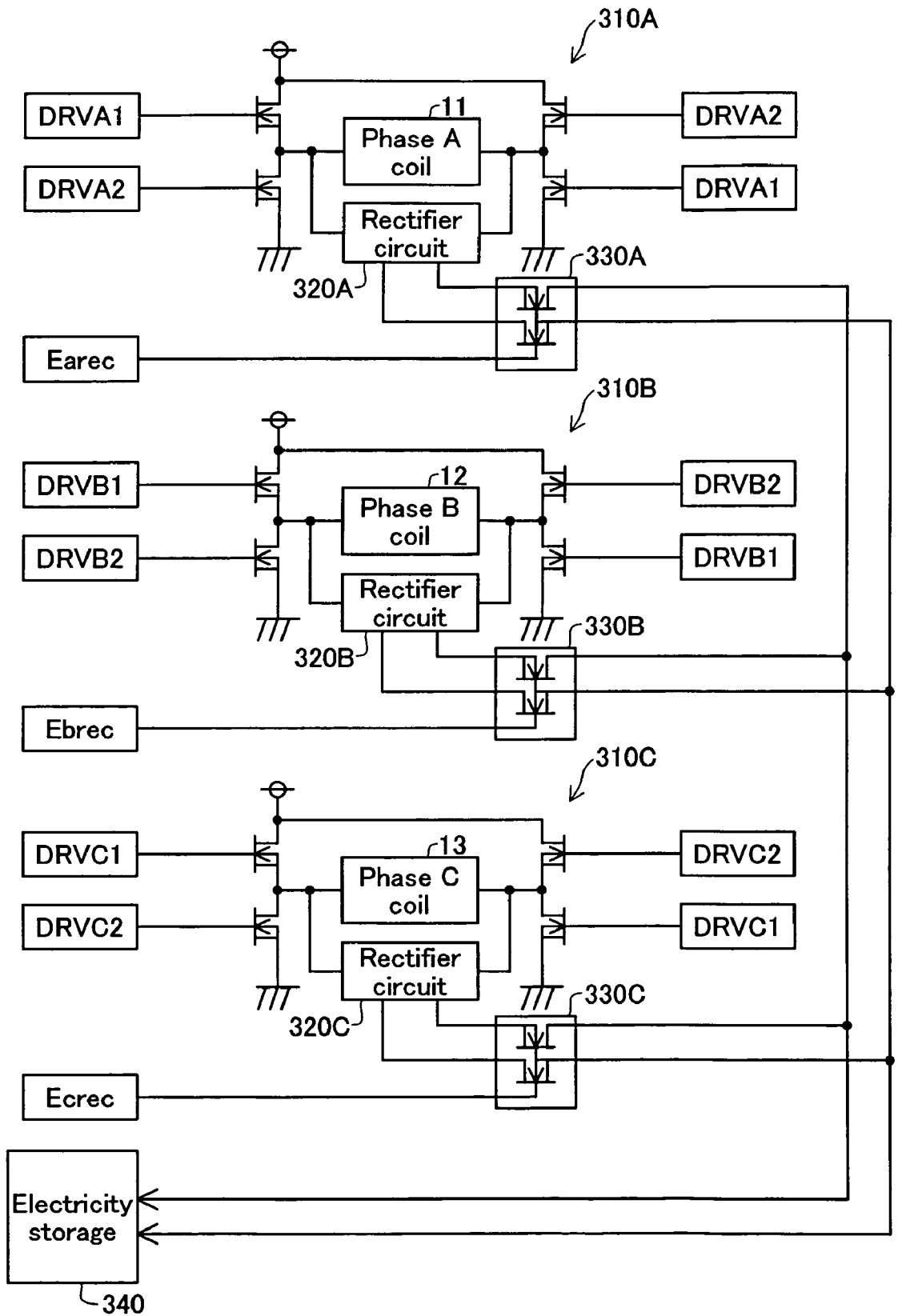
FIG. 6 is a block diagram showing configuration of a driver circuit, coils, a rectifier circuit, and a switch circuit.

FIG. 6 depicts the configuration of the driver circuit 310, the coils 11-13, the rectifier circuit 320, and the switch circuit 330. The suffix symbols A, B, C appended to the symbols for the driver circuit 310, the rectifier circuit 320, and the switch circuit 330 are for the purpose of distinguishing Phase A, Phase B, and Phase C. Since the circuits of each phase have the same configuration, for the most part, the configuration and operation of Phase A only will be discussed below.

The driver circuit 310A is composed of an H-bridge circuit, and drives the Phase A coils 11 according to the drive signals DRVA1, DRVA2. The rectifier circuit 320A is disposed between the coils 11 and the switch circuit 330A. The switch circuit 330A is connected to the electricity storage 340. A changeover signal Earec is presented to the transistors of the switch circuit 330A. Where the motor unit 100 is to function as a generator, the changeover signal Earec will go to H level and the switch circuit 330A will be connected, supplying the electricity storage 340 with regenerative current rectified by the rectifier circuit 320A. On the other hand, where the motor unit 100 is to function as a motor, the changeover signal Earec will go to L level, the switch circuit 330A will be disconnected, and the motor unit 100 will rotate according to the drive signals DRVA1, DRVA2.

FIGS. 7A through 7E show the internal configuration and operation of the control signal generator 500 (FIG. 5). Here, for convenience in illustration, only the Phase A signal is shown; signals will be generated in the same manner for the other phases as well.

The control signal generator 500 has a basic clock generator 510, a 1/N frequency divider 520, a PWM unit 530, a forward/reverse direction value register 540, a multiplier 550, an encoder 560, a control value register 580, and an excitation interval setter 590.

The basic clock generator 510 generates a clock signal PCL having prescribed frequency, and is composed of a PLL circuit, for example. The frequency divider 520 generates a clock signal SDC having a frequency equal to 1/N that of the clock signal PCL. The value of N is set to a prescribed constant. This value of N has been previously set in the frequency divider 520 by the CPU 700. In response to the clock signals PCL, SDC, a multiplication value Ma supplied by the multiplier 550, a forward/reverse direction value RI supplied by the forward/reverse direction value register 540, a positive/negative sign signal Pa supplied by the encoder 560, and an excitation interval signal Eadrv supplied by the excitation interval setter 590, the PWM unit 530 generates the Phase A drive signals DRVA1, DRVA2 (FIG. 4B). This operation will be discussed later in detail.

The value RI indicating the direction of rotation of the motor is set within the forward/reverse direction value register 540 by the CPU 700. In the present embodiment, the motor rotates forward when the forward/reverse direction value RI is L level, and rotates in reverse when the value is H level. However, where it is not necessary for the motor to run in reverse, the forward/reverse direction value register 540 may be dispensed with. The other signals Ma, Pa, and Eadrv presented to the PWM unit 530 are determined in the following manner.

The output SSA of the magnetic sensor 40A is presented to the encoder 560. The encoder 560 converts the range of the magnetic sensor output SSA, as well as setting the value of the middle point of sensor output to 0. As a result, the sensor output value Xa generated by the encoder 560 assumes values in a prescribed positive range (e.g. between +127 and 0) and in a prescribed negative range (e.g. between 0 and −127). However, the sensor output value Xa presented to the multiplier 550 by the encoder 560 is the absolute value; the positive or negative sign thereof, in the form of the positive/negative sign signal Pa, is provided to the PWM unit 530.

The control value register 580 stores a voltage control value Ya set by the CPU 700. This voltage control value Ya, together with the excitation interval signal Eadrv discussed later, functions as a value for setting the application voltage of the motor; the value Ya can assume a value of 0 to 1.0, for example. Assuming an instance where the excitation interval signal Eadrv has been set in such a way that all intervals are excitation intervals, with no non-excitation intervals being provided, when Ya=0 this will mean that the application voltage is zero, and when Ya=1.0 this will mean that application voltage is at its maximum value. The multiplier 550 performs multiplication of the voltage control value Ya and the sensor output value Xa output from the encoder 560 and integer conversion of the multiplication result; the multiplication value Ma thereof is presented to the PWM unit 530.

FIGS. 7B through 7E depict operation of the PVVM unit 530 in instances where the multiplication value Ma has assumed various values. Here, it is assumed that all intervals are excitation intervals and that there are no non-excitation intervals. The PWM unit 530 is a circuit that, during a single cycle of the clock signal SDC, generates one pulse at a duty factor of Ma/N. Specifically, as shown in FIGS. 7B through 7E, in association with an increasing multiplication value Ma, the pulse duty factor of the Phase A drive signals DRVA1, DRVA2 increases as well. The first drive signal DRVA1 is a signal that pulses only when the magnetic sensor output SSA is positive, and the second drive signal DRVA2 is a signal that pulses only when the magnetic sensor output SSA is positive; in FIGS. 7B through 7E, these are shown together. For convenience, the second drive signal DRVA2 is shown as negative pulses.

FIGS. 8A to 8C depict correspondence relationships between sensor output waveforms and waveforms of drive signals generated by the PWM unit 530. In the drawing, "Hiz" denotes a high impedance state with the magnet coils in the unexcited state. As explained in FIGS. 7A-7E, the Phase A drive signals DRVA1, DRVA2 are generated by PWM control using the analog waveform of the Phase A sensor output SSA. Consequently, using these Phase A drive signals DRVA1, DRVA2 it is possible to present the coils with effective voltage exhibiting changes in level corresponding to changes in the sensor output SSA.

Furthermore, the PWM unit 530 is designed to output drive signals only during excitation intervals indicated by the excitation interval signal Eadrv supplied by the excitation interval setter 590, and to not output drive signals during intervals other than excitation intervals (i.e. during non-excitation intervals). FIG. 8C depicts a drive signal waveform produced in the case where excitation intervals EP and non-excitation intervals NEP have been established by the excitation interval signal Eadrv. During excitation intervals EP, the drive signal pulses of FIG. 8B are generated as is, whereas during non-excitation intervals NEP, drive signal pulses are not generated. By establishing excitation intervals EP and non-excitation intervals NEP in this way, in proximity to the middle point of sensor output (this corresponds to proximity to the middle point of the back electromotive force waveform), voltage will not be applied to coils, thus making possible further improvement of motor efficiency. In preferred practice, excitation intervals EP will be established at symmetric intervals about the peak of the sensor output waveform (this is substantially equivalent to the back electromotive force waveform); and the non-excitation intervals NEP will be established at symmetric intervals about the middle point (center point) of the sensor output waveform.

As discussed previously, if the voltage control value Ya is set to a value of less than 1, the multiplication value Ma will be smaller in proportion to the voltage control value Ya. Consequently, effective adjustment of application voltage is possible through the voltage control value Ya as well.

It will be apparent from the preceding discussion that, with the motor of the present embodiment, it is possible to adjust the application voltage using both the voltage control value Ya and the excitation interval signal Eadrv. In preferred practice, relationships between the preferred application voltage on the one hand, and the voltage control value Ya and the excitation interval signal Eadrv on the other, will be stored in advance in table format in memory in the control circuit 200 (FIG. 5). By so doing, when the control circuit 200 has received from the outside a preferred target value for application voltage, it will be possible for the CPU 700 to set the voltage control value Ya and the excitation interval signal Eadrv settings in the control signal generator 500 in accordance with that target value. Adjustment of application voltage does not require the use of both the voltage control value Ya and the excitation interval signal Eadrv, and it is acceptable to use either one of these instead.

Figure 9:
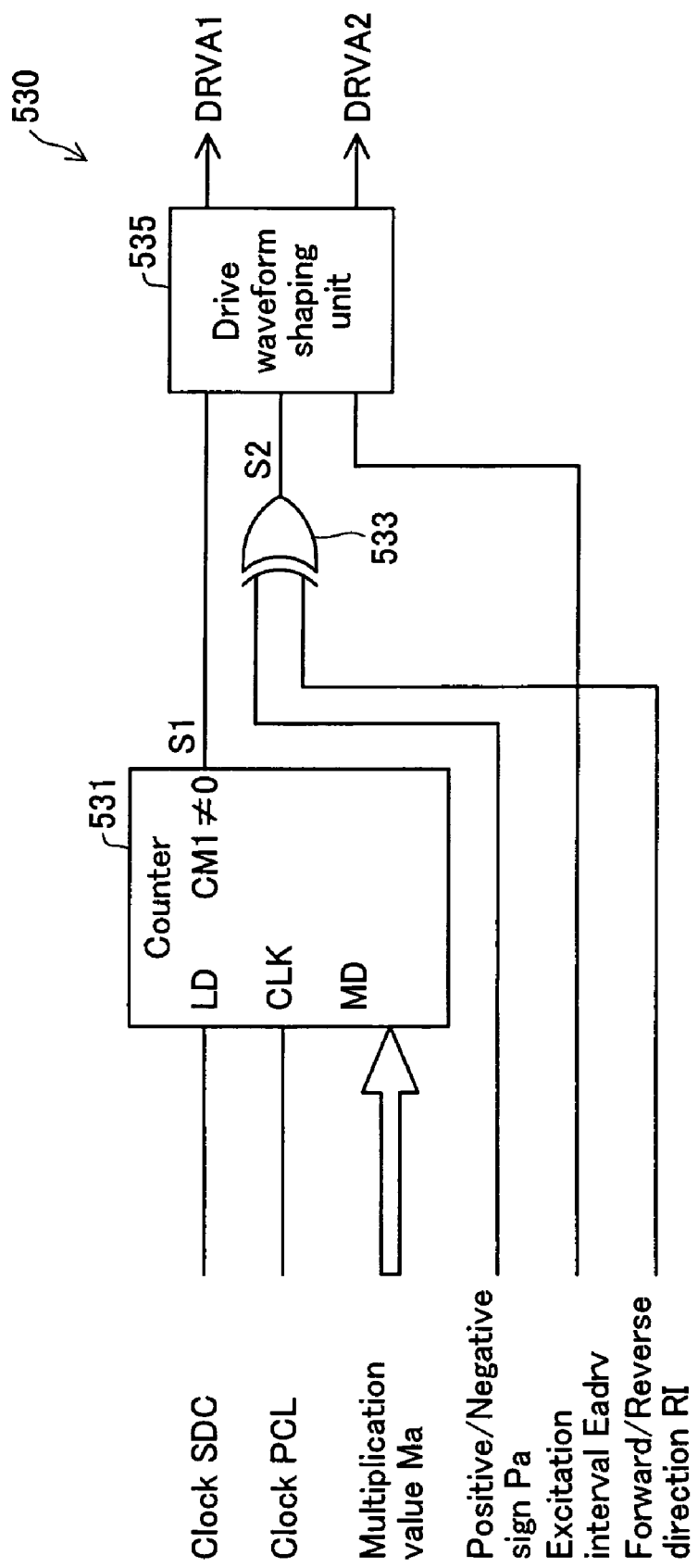
FIG. 9 is a block diagram depicting internal configuration of a PWM unit.

FIG. 9 is a block diagram depicting the internal configuration of the PWM unit 530 (FIG. 7A). The PWM unit 530 has a counter 531, an EXOR circuit 533, and a drive waveform shaping unit 535. Their operations will be described below.

Figure 10:
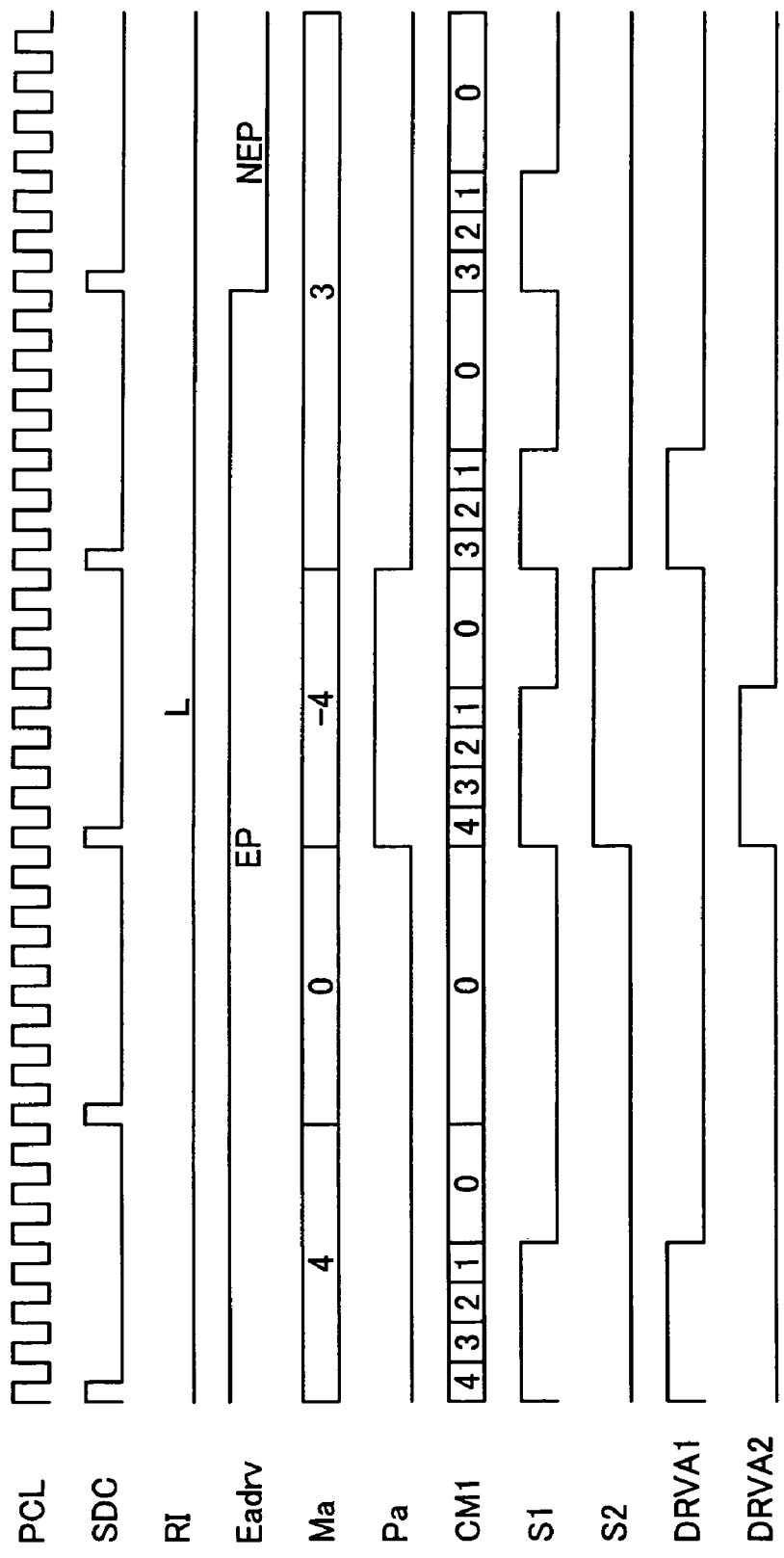
FIG. 10 is a timing chart depicting operation of the PWM unit during forward rotation of the motor.

FIG. 10 is a timing chart depicting operation of the PWM unit 530 during forward rotation of the motor. In the drawing, the two clock signals PCL and SDC, the forward/reverse direction value RI, the excitation interval signal Eadrv, the multiplication value Ma, the positive/negative sign signal Pa, the counter value CM1 in the counter 531, the output S1 of the counter 531, the output S2 of the EXOR circuit 533, and the output signals DRVA1, DRVA2 of the drive waveform shaping unit 535 are shown. In each one cycle of the clock signal SDC, the counter 531 repeats an operation decrementing the count value CM1 down to 0 in sync with the clock signal PCL. The initial value of the count value CM1 is set to the multiplication value Ma. In FIG. 10, for convenience in illustration, negative values are shown as multiplication values Ma as well; however, the counter 531 will use absolute values |Ma| thereof. The output S1 of the counter 531 is set to H level when the count value CM1 is not 0, and drops to L level when the count value CM1 goes to 0.

The EXOR circuit 533 outputs a signal S2 representing exclusive OR of the positive/negative sign signal Pa and the forward/reverse direction value RI. When the motor is running forward, the forward/reverse direction value RI is L level. Consequently, the output S2 of the EXOR circuit 533 will be a signal identical to the positive/negative sign signal Pa. The drive waveform shaping unit 535 generates the drive signals DRVA1, DRVA2 from the output S1 of the counter 531 and the output S2 of the EXOR circuit 533. Specifically, in the output S1 of the counter 531, the signal at intervals in which the output S2 of the EXOR circuit 533 is L level is output as the drive signal DRVA1, and the signal at intervals in which the output S2 of the EXOR circuit 533 is H level is output as the drive signal DRVA2. The excitation interval signal Eadrv falls to L level in proximity to the right edge in FIG. 10, thereby establishing a non-excitation interval NEP. Consequently, during this non-excitation interval NEP, neither of the drive signals DRVA1, DRVA2 will be output and a state of high impedance will be maintained.

Figure 11A:
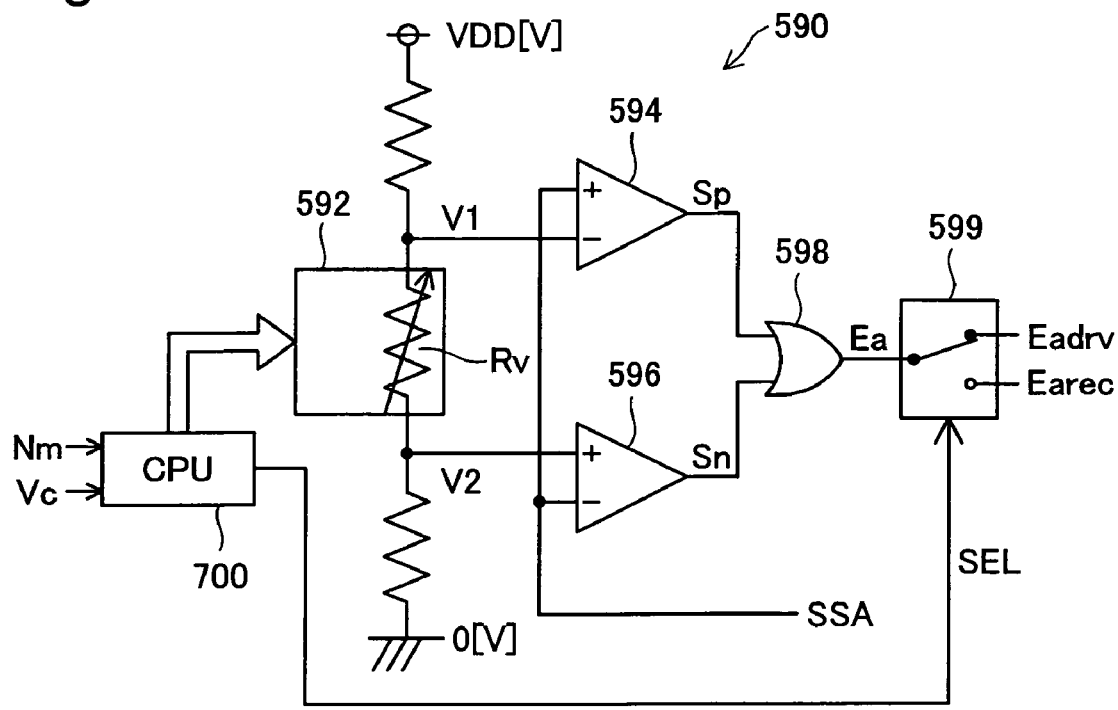
FIGS. 11A and 11B illustrate internal configuration and operation of an excitation interval setter.
Figure 11B:
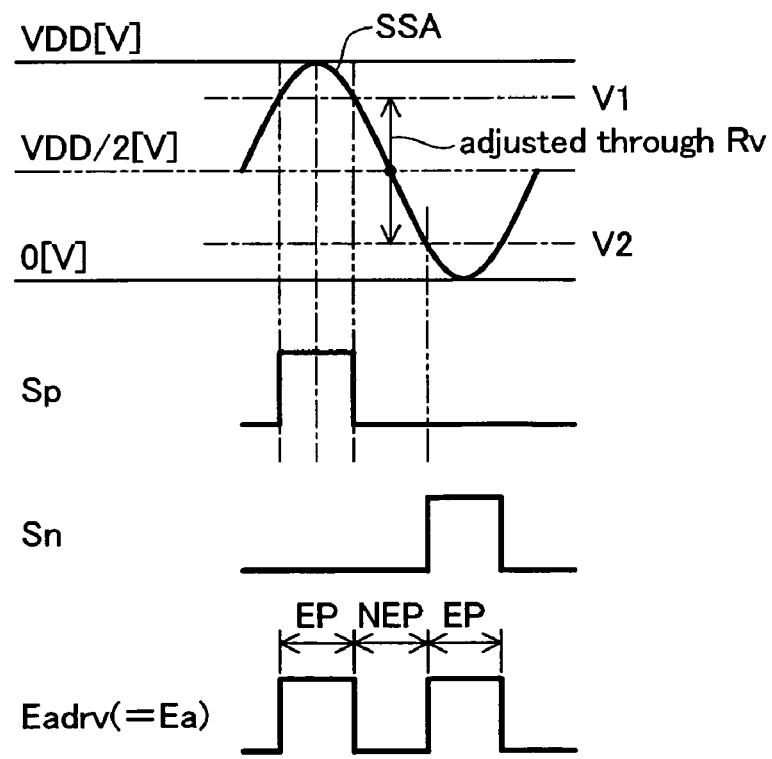

FIGS. 11A and 11B show the internal configuration and operation of the excitation interval setter 590. The excitation interval setter 590 has an electronic variable resistor 592, voltage comparators 594, 596, an OR circuit 598, and a changeover switch 599. The resistance Rv of the electronic variable resistor 592 is set by the CPU 700. The voltages V1, V2 at the two terminals of the electronic variable resistor 592 are presented to one input terminal of each of the voltage comparators 594, 596. The sensor output SSA is presented to the other input terminal of the voltage comparators 594, 596. The output signals Sp, Sn of the voltage comparators 594, 596 are input to the OR circuit 598. The output Ea of the OR circuit 598 is presented to the changeover switch 599. Depending on a Select signal SEL provided by the CPU 700, the changeover switch 599 outputs the output Ea of the OR circuit 598 either as the excitation interval signal Eadrv or as the changeover signal Earec. The excitation interval signal Eadrv is presented to the PWM unit 530 (FIG. 7A) and is used for the purpose of specifying the excitation intervals EP as shown in FIG. 8C. The changeover signal Earec, on the other hand, is supplied to the switch circuit 330 (FIG. 5) and used for the purpose of storing the rectified regenerative current. The level of the Select signal SEL will be set on the basis of the motor rotation speed Nm and/or the flow velocity Vc. This point will be discussed later in detail.

FIG. 11B depicts the operation of the excitation interval setter 590. The two terminal voltages V1, V2 of the electronic variable resistor 592 are modified by adjusting the resistance Rv. Specifically, the two terminal voltages V1, V2 are set to values of equal difference from the median value of the voltage range (=VDD/2). In the event that the sensor output SSA is higher than the first voltage V1, the output Sp of the first voltage comparator 594 will go to H level, whereas in the event that the sensor output SSA is lower than the second voltage V2, the output Sn of the second voltage comparator 596 will go to H level. The output signal Ea of the OR circuit 598 is a logical OR of these output signals Sp, Sn. Consequently, as shown at bottom in FIG. 11B, the excitation interval signal Eadrv can be used as a signal for indicating the excitation intervals EP and the non-excitation intervals NEP. The excitation intervals EP and the non-excitation intervals NEP are established by means of adjustment of the variable resistance Rv by the CPU 700.

FIGS. 12A and 12B show an example of sensor outputs and regenerative power during regeneration. FIG. 12A shows the sensor outputs SSA to SSC of each phase, as well as the two terminal voltages V1, V2 that have been set by the excitation interval setter 590. FIG. 12B shows regenerative power regenerated according to setting of these two terminal voltages V1, V2. A signal synthesized from the regenerative power signals for the three phases is presented to the electricity storage 340 (FIG. 6). It is possible to utilize a secondary cell or large-capacity capacitor as the electricity storage 340.

B. Control Methods Embodiments

Figure 13:
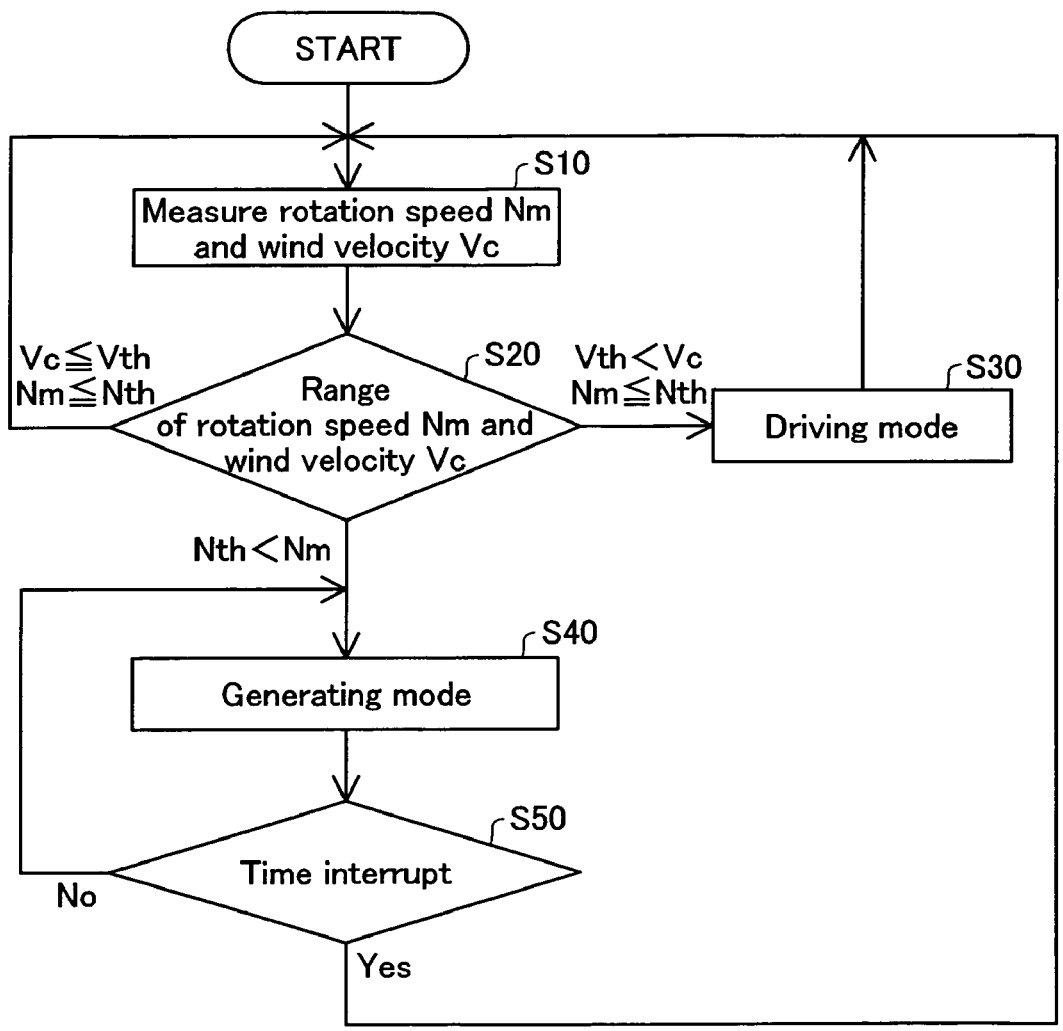
FIG. 13 is a flowchart illustrating a first embodiment of a method for controlling a power generating device.

FIG. 13 is a flowchart illustrating a first embodiment of a method for controlling a power generating device by the control circuit 200 (FIG. 5). In Step S10, the rotation speed Nm and the wind velocity Vc are measured. In Step S20, the ranges of the rotation speed Nm and the wind velocity Vc are compared respectively with threshold values Nth, Vth, and control is executed selectively depending to the following three alternative cases.

(1-1) Where $Nm \leq Nth$ and $Vc < Vth$:

In this case, the control circuit 200 will stand by, without operating the motor unit 100 as either a generator or a motor. The reason is that since the wind velocity Vc is low and the rotation speed of the motor unit 100 is slow, it is highly likely that effective generation will not be possible.

(1-2) Where $Nth < Nm$:

In this case, the system will immediately transition to the generating mode of Step S40 and the control circuit 200 will operate the motor unit 100 as a generator, irrespective of the magnitude of the wind velocity Vc. The reason is that effective generation is possible as long as the rotation speed Nm of the motor is sufficiently high. The reason why the wind velocity Vc is not taken as a decision criterion in this instance is that it is normal for the wind velocity Vc to be sufficiently high if the rotation speed Nm of the motor is sufficiently high.

(1-3) Where $Nm \leq Nth$ and $Vth < Vc$:

In this case, the system will transition to the driving mode of Step S30, and the control circuit 200 will operate the motor unit 100 as a motor and increase the rotation speed of the vane 1200; the system will subsequently transition to Step S40 via Steps S10 and S20 and operate the motor unit 100 as a generator. The reason for carrying out control in this manner is that where the rotation speed Nm of the motor is substantially zero but the wind velocity Vc is sufficiently high, it is conceivable that turning of the vane 1200 is being hindered by static friction or the like within the power generating device. Accordingly, in such instances, it will be possible to carry out effective power generation by first using the motor unit 100 as a motor to bring about sufficient turning of the vane 1200. Alternatively, the system may transition directly to Step S40 after Step S30, skipping the second occurrences of Steps S10 and S20.

In Step S20, criteria that include the wind velocity Vc (e.g. the criterion of "whether both the rotation speed Nm and the wind velocity Vc exceed the respective threshold values Nth, Vth") may be used instead, as criteria for deciding whether to transition immediately to generating mode. Here, in the event that, for example, only one of the rotation speed Nm and the wind velocity Vc exceeds its threshold value but the other does not exceed its threshold value, as in (1-3) above, the motor unit 100 may first be operated as a motor to turn the vane, and the motor unit 100 may be subsequently operated as a generator.

Once power generation commences in Step S40, the system stands by until a time interrupt is input to the CPU 700 in Step S50. After the time interrupt, the system returns to Step S10 and repeats control as discussed above.

In this way, in the control method of Embodiment 1 depicted in FIG. 13, standby, driving mode, or generating mode is selected on the basis of both the rotation speed Nm of the motor and the wind velocity Vc, making it possible to carry out effective power generation. In particular, where the wind velocity Vc is greater than the wind velocity threshold value Vth but the rotation speed Nm is smaller than the rotation speed threshold value Nth, driving mode will be executed before transitioning to the generating mode, thereby making it possible to generate power by effectively using relatively low wind force.

The rotation speed threshold value Nth may also be set to zero. For example, it is acceptable to perform control according to the sequence for the case (1-1) or (1-3) described above if the rotation speed Nm is not zero, and to perform the control according to the sequence for the case (1-2) if the rotation speed Nm is equal to zero. On the other hand, in preferred practice, the wind velocity threshold value Vth will be a non-zero value. The reason is that setting the wind velocity threshold value Vth to a prescribed value greater than zero increases the likelihood of effective power generation in control according to the sequence for the case (1-3) described above. These threshold values Nth, Vth may be determined experimentally or through experience.

Figure 14:
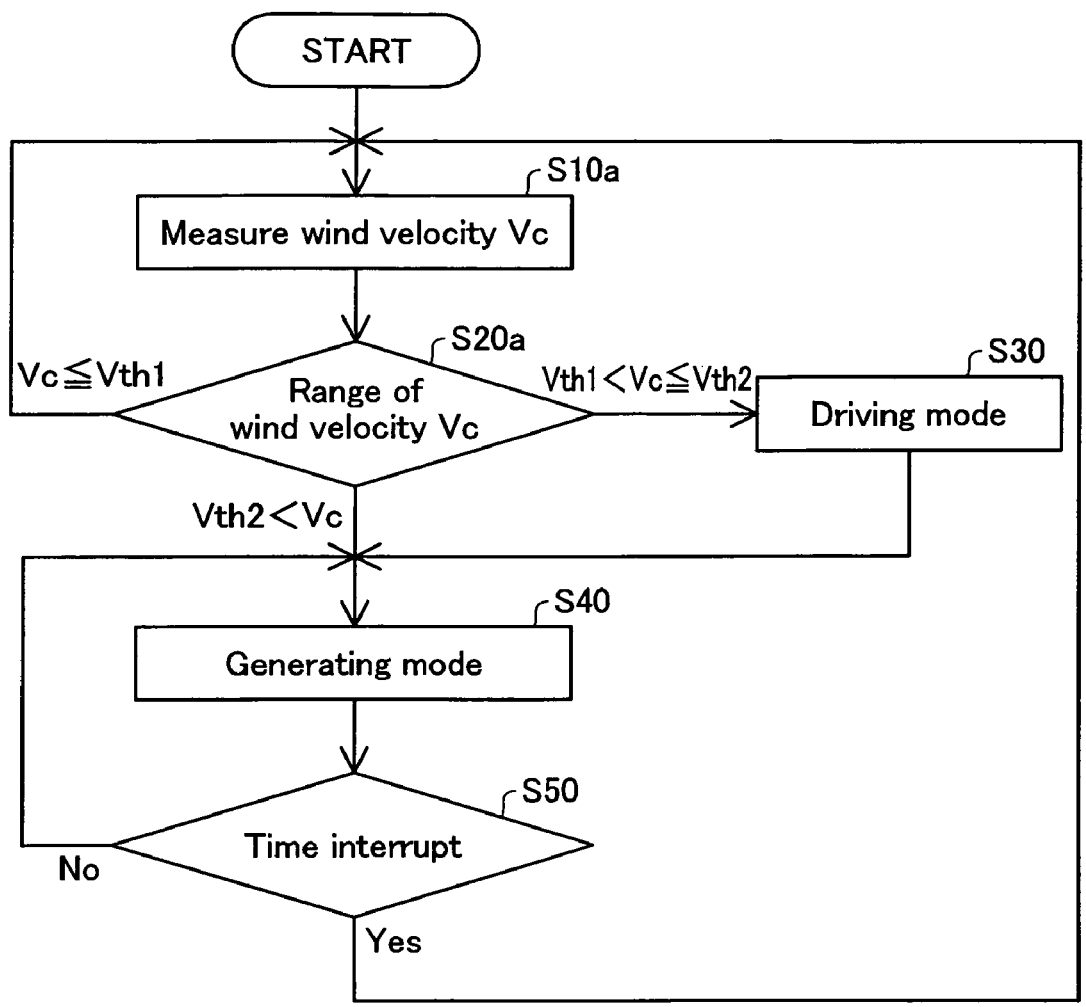
FIG. 14 is a flowchart illustrating a second embodiment of a method for controlling a power generating device.

FIG. 14 is a flowchart illustrating a second embodiment of a method for controlling a power generating device. This procedure differs from the procedure of FIG. 13 in that only wind velocity is used in the control mode selection decision; rotation speed is not used. Specifically, in Step S10a the wind velocity Vc is measured; and in Step S20a the range of wind velocity Vc is compared respectively with threshold values Vth1, Vth2, and control is executed selectively depending to the following three alternative cases.

(2-1) Where $Vc \leq Vth1$:

In this case, the control circuit 200 will stand by, without operating the motor unit 100 as either a generator or a motor.

(2-2) Where $Vth2 < Vc$:

In this case, the system will transition to the generating mode of Step S40 and the control circuit 200 will operate the motor unit 100 as a generator.

(2-3) Where $Vth1 < Vc \leq Vth2$:

In this case, the system will transition to the driving mode of Step S30, and the control circuit 200 will operate the motor unit 100 as a motor and increase the rotation speed of the vane 1200; then subsequently transition to Step S40 and operate the motor unit 100 as a generator.

According to the control method of Embodiment 2, it is possible to carry out effective power generating according to the wind velocity Vc. The first threshold value Vth1 is smaller than the second threshold value Vth2 and may be equal to zero. In Embodiment 2, since the rotation speed Nm is not used, it is possible to eliminate the rotation speed determining unit 600 (FIG. 5).

Figure 15:
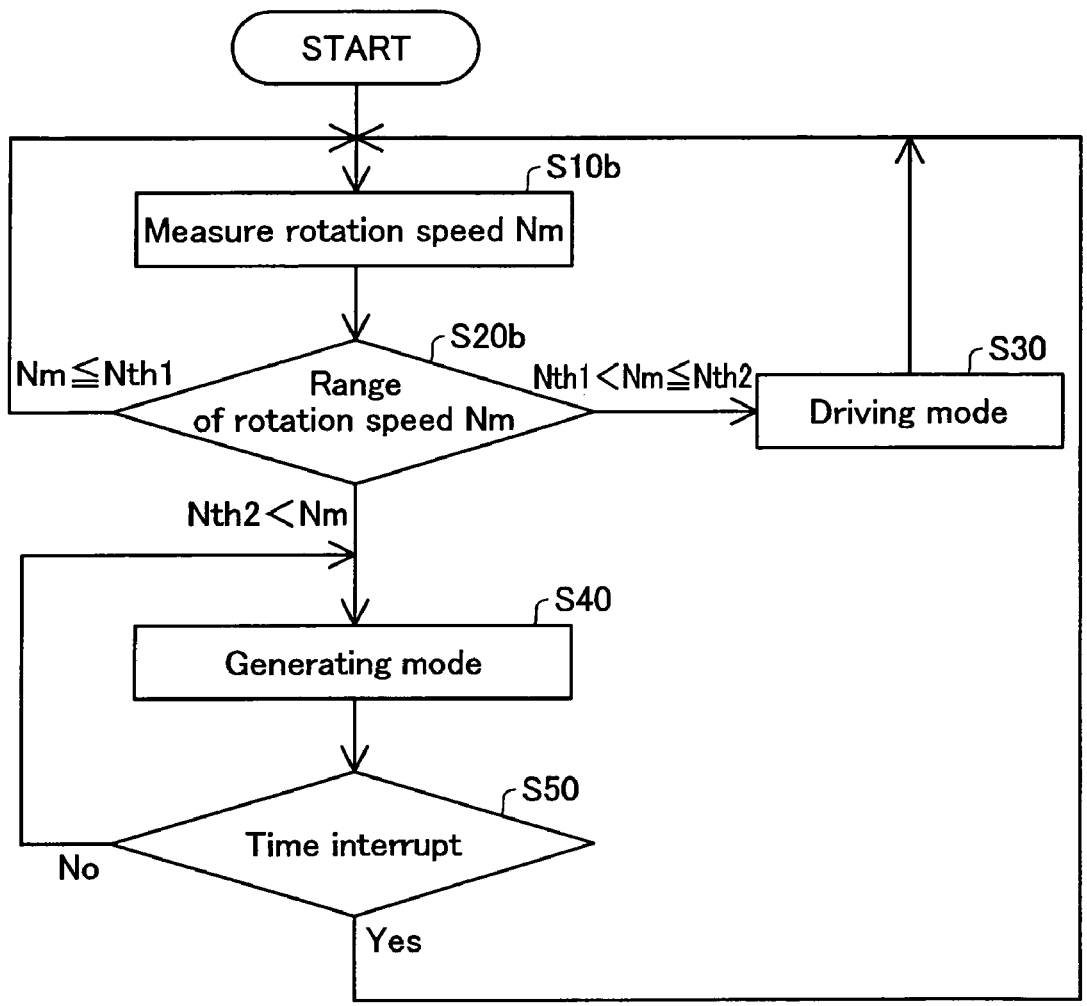
FIG. 15 is a flowchart illustrating a third embodiment of a method for controlling a power generating device.

FIG. 15 is a flowchart illustrating a third embodiment of a method for controlling a power generating device. This procedure differs from the procedure of FIG. 14 in that rotation speed is used in place of wind velocity in the control mode selection decision. Specifically, in Step S10b the rotation speed Nm is measured; and in Step S20b the range of rotation speed Nm is compared respectively with threshold values Nth1, Nth2, and control is executed selectively depending to the following three alternative cases.

(3-1) Where $Nm \leq Nth1$:

In this case, the control circuit 200 will stand by, without operating the motor unit 100 as either a generator or a motor.

(3-2) Where $Nth2 < Nm$:

In this case, the system will transition to the generating mode of Step S40 and the control circuit 200 will operate the motor unit 100 as a generator.

(3-3) Where $Nth1 < Nm \leq Nth2$:

In this case, the system will transition to the driving mode of Step S30, and the control circuit 200 will operate the motor unit 100 as a motor and increase the rotation speed of the vane 1200; then subsequently transition to Step S40 and operate the motor unit 100 as a generator. Alternatively, the system may transition directly to Step S40 after Step S30, skipping the second occurrences of Steps S10b and 20b.

According to the control method of Embodiment 3, it is possible to carry out effective power generating according to the rotation speed Nm. The first threshold value Nth1 is smaller than the second threshold value Nth2 and may be equal to zero. In Embodiment 3, since the wind velocity Vc is not used, it is possible to eliminate the wind gauge 1130 (FIG. 1).

As will be understood from Embodiments 1 to 3 discussed hereinabove, if at the time of startup of the generator motor, either the flow velocity Vc or the rotation speed Nm or both lies within a prescribed low range, it is preferable to first operate the generator motor as a motor in order to increase the rotation speed of the vane, and then operate the generator motor as a generator. By so doing, it will be possible to turn the vane and initiate power generation, even in conditions where the vane cannot reach sufficient rotation speed due to low flow velocity and mechanical loss etc.

C. Modification Examples:

The foregoing description of the present invention based on certain preferred embodiments is provided for illustration only and not for the purpose of limiting the invention, and various modifications such as the following may be made herein without departing from the scope of the invention.

C1. Modification Example 1

The present invention is not limited to wind-powered generating devices, and is applicable generally to power generating devices that utilize hydrodynamic force. For example, in the case of a water-powered generating device, in the configuration depicted in FIG. 1, the vane 1200 may be replaced by a hydraulic turbine and the wind gauge 1130 replaced by a flow meter. Herein, the term "vane" is used to refer generally to a component for converting hydrodynamic force to rotational force, and is defined broadly to include the vane of a hydraulic turbine. The term "flow gauge" herein refers an instrument that measures a quantity proportional to flow velocity, such as a wind gauge or flow meter.

C2. Modification Example 2

In the preceding embodiments, the generator motor is implemented as a brushless motor, but the generator motor may instead be implemented as other types of motor. However, by utilizing a brushless motor it is possible to achieve a generator motor having good efficiency. In this sense, the use of a coreless brushless motor is especially preferred.

What is claimed is:

1. A power generating device utilizing hydrodynamic force, comprising:
   a vane rotated by hydrodynamic force from a fluid;
   a generator motor mechanically linked to the vane and operative as a generator and a motor;
   at least one of a flow velocity measuring unit configured to measure flow velocity of the fluid, and a rotation speed measuring unit configured to measure the rotation speed of the generating device;
   a control unit configured to control the generator motor based on at least one of flow velocity measured by the flow velocity measuring unit and rotation speed measured by the rotation speed measuring unit, and
   a transmission disposed between the vane and the generator motor to mechanically link the vane and the generator motor for making the rotation speed of the generator motor faster than the rotation speed of the vane.
   wherein if at least one of the flow velocity and the rotation speed lies within a prescribed low range at startup of the generator motor, the control unit operates the generator motor as a motor to increase the rotation speed of the vane, and then operates the generator motor as a generator, and
   wherein, at startup of the generator motor,
   (i) if the flow velocity is equal to or less than a first flow velocity threshold value, the control unit causes the generator motor to stand by without starting UP the generator motor;
   (ii) if the flow velocity exceeds a second flow velocity threshold value greater than the first flow velocity threshold value, the control unit operates the generator motor as a generator; and
   (iii) if the flow velocity lies between the first and second flow velocity threshold values, the control unit operates the generator motor as a motor to increase the rotation speed of the vane, and then operates the generator motor as a generator.

2. A method of controlling a power generating device comprising a vane rotated by hydrodynamic force from a fluid, and a generator motor mechanically linked to the vane, the method comprising the step of:
   if at least one of flow velocity of the fluid and rotation speed of the generator motor lies within a prescribed low range at startup of the generator motor, operating the generator motor as a motor to increase the rotation speed of the vane, and then operating the generator motor as a generator,
   wherein the power generating device includes a transmission disposed between the vane and the generator motor to mechanically link the vane and the generator motor for making the rotation speed of the generator motor faster than the rotation speed of the vane, and
   wherein, at startup of the generator motor,
   (i) if the flow velocity is equal to or less than a first flow velocity threshold value, causing the generator motor to stand by without starting UP the generator motor;
   (ii) if the flow velocity exceeds a second flow velocity threshold value greater than the first flow velocity threshold value, operating the generator motor as a generator; and
   (iii) if the flow velocity lies between the first and second flow velocity threshold values, operating the generator motor as a motor to increase the rotation speed of the vane, and then operating the generator motor as a generator.

* * * * *